12/17/85 OR 4,558,925

United States Patent [19]
Casseday et al.

[11] Patent Number: 4,558,925
[45] Date of Patent: Dec. 17, 1985

[54] MULTI-FUNCTION ACOUSTO-OPTIC SIGNAL PROCESSOR

[75] Inventors: Michael W. Casseday, Washington, D.C.; Norman J. Berg, Baltimore; Andree N. Filipov, Silver Spring, both of Md.

[73] Assignee: The United States of America as represented by the Secretary of the Army, Washington, D.C.

[21] Appl. No.: 637,173

[22] Filed: Aug. 2, 1984

[51] Int. Cl.[4] .......................... G02F 1/33; G06G 9/00
[52] U.S. Cl. .......................... 350/358; 364/822
[58] Field of Search ............... 350/358, 371; 364/822, 364/829–830, 837

[56] References Cited

U.S. PATENT DOCUMENTS

| | | | |
|---|---|---|---|
| 4,225,938 | 9/1980 | Turpin | 350/358 |
| 4,326,778 | 4/1982 | Berg et al. | 350/358 |
| 4,421,388 | 12/1983 | Berg et al. | 350/358 |
| 4,426,134 | 1/1984 | Abramovitz et al. | 350/358 |
| 4,448,494 | 5/1984 | Freyre | 350/371 |

OTHER PUBLICATIONS

Kellman, P. "Time Integrating Optical Signal Processing", Optical Engineering 5/6–1980, pp. 370–375.

Sprague et al. "Time Integrating Acoustooptic Correlator" App. Optics 1–1976, pp. 89–92.

Casseday et al. "A New Multi-Function Acousto Optic Signal Processor, IEEE Ultrasonic Symp., Atlanta Georgia 11–3–83 Copy In File.

*Primary Examiner*—William H. Punter
*Attorney, Agent, or Firm*—Saul Elbaum; Harry Lupuloff; Anthony T. Lane

[57] ABSTRACT

An acousto-optic architecture is provided for simultaneously obtaining time integration correlation and power spectrum analysis. A laser beam is expanded and split into first and second beams. The first beam is diffracted by a first acousto-optic Bragg cell, and the second beam is diffracted by a second acousto-optic Bragg cell. The diffracted first beam is split into third and fourth beams, and the diffracted second beam is split into fifth and sixth beams. A first Fourier transform lens system is placed in the path of the third beam, and a first photodiode detector array is placed at the back focal plane of the lens system. A second Fourier transform lens system is placed in the path of the sixth beam, and a second photodiode detector array is placed at the back focal place of the lens system. The fourth and fifth beams are combined and the combined beam is split into seventh and eighth beams. A first Schlerin spatial filter is disposed in the path of the seventh beam for filtering undiffracted light from it. A second Schlerin spatial filter is disposed in the path of the eighth beam for filtering undiffracted light from it. A third photodiode detector array is disposed in the output of the first Schlerin spatial filter, and a fourth detector is disposed in the output of the second Schlerin spatial filter. The outputs of the first and second photodiode detector arrays are proportional to the power spectral density of the signals $S_1(t)$ and $S_2(t)$, which are respectively applied to the first and second Bragg cells. These outputs are resolved to a limit determined by the time aperture of the Bragg cells and are time averaged over the integration period of the array. The output of the third photodiode detector array is proportional to the correlation of the bandpass signals $S_1(t)\cos\omega_a t$ offset by the frequency $\omega_o$ and in a compressed, shifted time frame. The output of the fourth photodiode detector array is proportional to the correlation of the bandpass signals $S_1(t)\cos\omega_a t$ and $S_2(t)\cos\omega_a t$ offset by the frequency $\omega_o$, but in a more restricted delay range than that of the third photodiode detector array.

13 Claims, 6 Drawing Figures

MULTI-FUNCTION ACOUSTO-OPTIC SIGNAL PROCESSOR

RIGHTS OF THE GOVERNMENT

The invention described herein may be manufactured, used or licensed by or for the government of the United States of America for governmental purposes without payment to us of any royalties thereon.

BACKGROUND OF THE INVENTION

This invention discloses an acousto-optic architecture for simultaneously obtaining time integration correlation and power spectrum analysis. The processor is designed to use commercially available Bragg cells and photodiode detector arrays, and should be realizable in fairly compact form. The correlator portion of the processor is a coherent, interferometric implementation, allowing attainment of the maximum possible bandwidth and dynamic range while achieving a time-bandwidth product of one million. The Bragg cell spectrum analyzer portion resolves a 30 MHz instantaneous bandwidth to 25 KHz, and can determine discrete frequency reception time to 10 μs. The architecture is especially configured for spread spectrum signal detection, and a parallel combining scheme is disclosed to extend the instantaneous bandwidth of systems employing it.

The correlator portion of the processor is generically similar to the two beam surface acoustic wave time integrating correlator disclosed in U.S. Pat. No. 4,326,778, entitled "Acousto-Optic Time Integrating Correlator," and obtains the same maximum performance from a given detector diode array. In the patent, a highly efficient time integrating acousto-optic correlator which determines the time difference of arrival of the signals being correlated as well as the center frequency and bandwidth of the signals is disclosed. A surface acoustic wave delay line is provided with two counter-propagating surface acoustic waves with wavefronts tilted with respect to each other. Two laser beams are directed across the propagating waves with an angle of $4\theta_B$ between them where $\theta_B$ is the Bragg angle, so that one beam interacts primarily with one propagating wave while the other beam interacts with the other wave. The modulated optical beams are directed to a time-integrating photodetector means which provides a signal output corresponding to the correlation function.

Another correlator is disclosed in U.S. Pat. No. 4,421,388, entitled "Acousto-Optic Time Integrating Frequency Scanning Correlator." An acousto-optic time integrating two-dimensional frequency scanning correlator is disclosed for cross correlating signals which are separated in frequency. Two coherent light beams which are derived from the same laser are fed across respective Bragg cells, one cell having the signal $A(t) \cos \omega_A(t)$ propagating thereacross and the other cell having the signal $B(t) \cos \omega_B t$ propagating thereacross. The respective output beams are compressed in the x-direction and expanded in the y-direction and are made incident on an acousto-optical correlator device having chirp signals counter-propagating thereacross. The optical output is fed to a time-integrating photodiode array which provides an output signal corresponding to the cross-correlation of A(t) and B(t).

In U.S. Pat. No. 4,225,938 to Turpin, entitled "Time-Integrating Acousto-Optical Processors," acousto-optical information processors employing a two-dimensional, time integrating architecture are disclosed. These three-product type processors are multi-purpose processors which can perform a variety of complex signal processing operations in two-dimensions, without requiring two-dimensional spatial light modulators. Typical of these processing operation are two-dimensional correlation, spectrum analysis, and cross ambiguity function processing. Some of the two-dimensional processing operations are made possible by the incorporation into a two-dimensional correlator of a distributed local oscillator, which may be implemented with mechanical-optical or electro-optical techniques.

SUMMARY OF THE INVENTION

A multipurpose acousto-optic architecture for obtaining simultaneously both power spectrum analysis and time integration correlation is provided. In this device a laser beam is expanded and split by a cube beam splitter into first and second beams. The first and second beams are diffracted by first and second acousto-optic Bragg cells. A second cube beam splitter is positioned in the path of the first diffracted beam for splitting it into third and fourth beams, and a third cube beam splitter is positioned in the path of the second diffracted beam for splitting it into fifth and sixth beams.

A first Fourier transform lens is disposed in the path of the third beam, and a second Fourier transform lens is disposed in the path of the sixth beam. A first square-law photodiode detector array is disposed at the back focal plane of the first Fourier transform lens, and a second square-law photodiode detector array is disposed at the back focal plane of the second Fourier transform lens. The outputs of the first and second photodiode detector arrays are proportional to the power spectral density of the signals $S_1(t)$ and $S_2(t)$, which are respectively applied to the first and second Bragg cells. These outputs are resolved to a limit determined by the time aperture of the Bragg cells and are time averaged over the integration period of the array.

A fourth cube beam splitter is used to combine the fourth and fifth beams and then to split the combined beam into seventh and eighth beams. A first Schlerin spatial filter system is disposed in the path of the seventh beam for filtering undiffracted light from the seventh beam. A second Schlerin spatial filter system is disposed in the path of the eighth beam for filtering undiffracted light from the eighth beam. A third time integrating square-law photodetector array is disposed in the path of the output from the first Schlerin spatial filter, and a fourth time integrating square-law photodiode is disposed in the path of the output from the second Schlerin spatial filter. The output of the third photodiode detector array is proportional to the correlation of the bandpass signals $S_1(t) \cos \omega_a t$, and $S_2(t) \cos\omega_a t$ offset by the frequency $w_o$, and in a compressed, shifted time frame. The output of the fourth photodiode detector array is proportional to the correlation of the bandpass signals $S_1(t) \cos\omega_a t$ and $S_2(t)$ offset by the frequency $\omega_o$, but in a more restricted delay range than that of the third photodiode detector array.

The first and second acousto-optic Bragg cells are each comprised of an ultrasonic medium, an acoustic transducer, and an acoustic absorber. Each cell is supplied with a signal, which is propagated through the cell by means of the acoustic transducer.

OBJECTS OF THE INVENTION

It is an object of this invention to provide a multipurpose acousto-optic architecture for obtaining simultaneously both power spectrum analysis and time integration correlation.

It is a further object of this invention to provide a processor which is designed to use commercially available Bragg cells and photodiode detector arrays, and which should be realizable in fairly compact form.

It is another object of this invention to provide a processor in which the correlator portion is a coherent, interferometric implementation, allowing attainment of the maximum possible bandwith and dynamic range while achieving a time-bandwidth product of one million.

Another object of this invention is to present a Bragg cell spectrum analyzer portion capable of resolving a 30 MHz instantaneous bandwith to 25 kHz, and which can determine discrete frequency reception time to 10 μs.

Another object of the invention is to provide an architecture which is especially well configured for spread spectrum signal detection.

Lastly, it is an object of this invention to provide a parallel combining scheme to extend the instantaneous bandwidth of systems employing the multipurpose acousto-optic architecture.

DESCRIPTION OF THE PREFERRED EMBODIMENT

Figure 1:
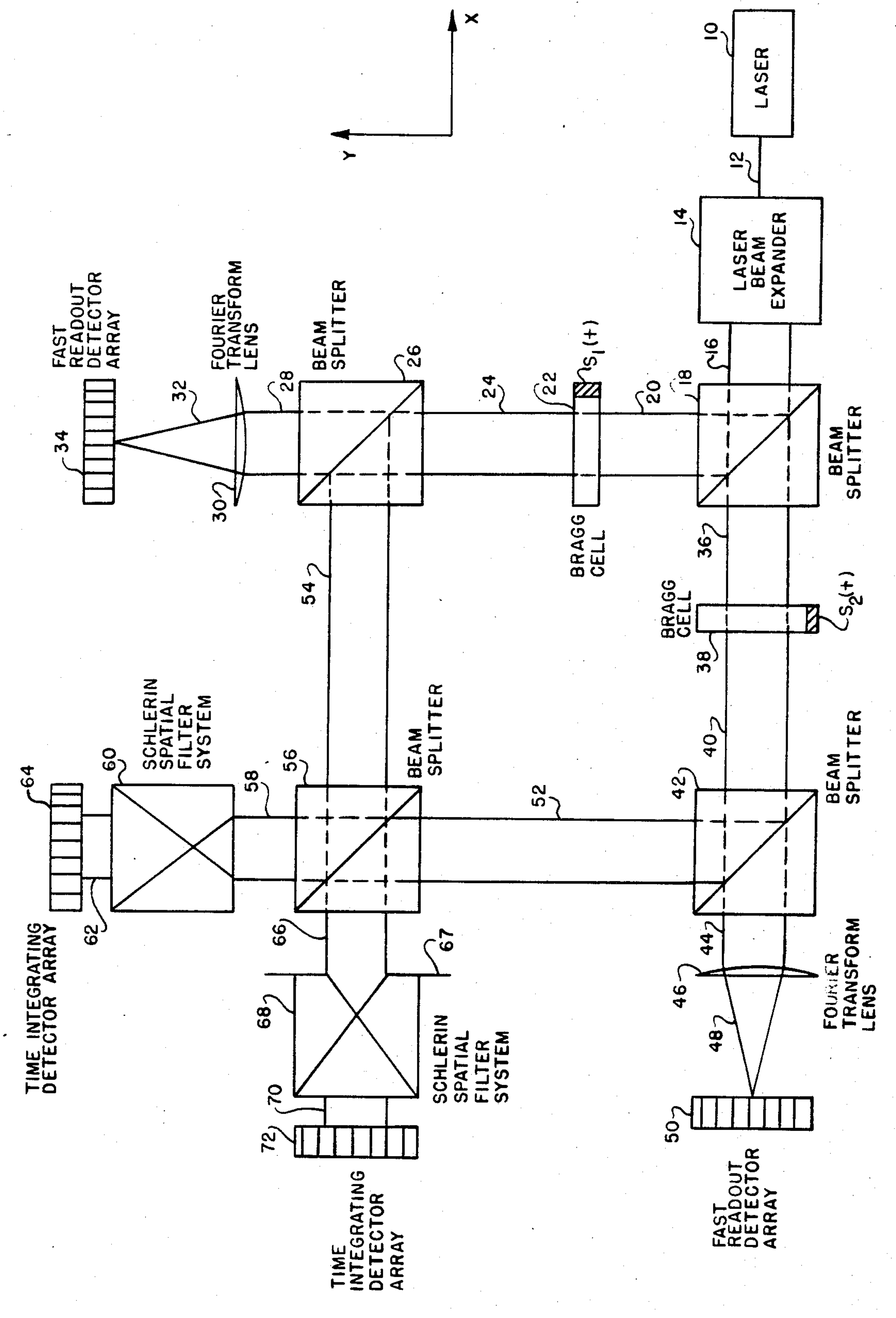
FIG. 1 illustrates the multipurpose acousto-optic architecture for obtaining simultaneously both power spectrum analysis and time integration correlation.

FIG. 1 illustrates the multipurpose acousto-optic architecture for obtaining simultaneously both power spectrum analysis and time integration correlation. As shown in FIG. 1, laser 10 generates a beam 12 of collimated, coherent light. Laser beam 12 is expanded by a beam expander 14, and the expanded beam 16 is directed to first cube beam splitter 18. A cube beam splitter is used to minimize spurious reflections. Cube beam splitter 18 splits beam 16 into first beam 20 and second beam 36. Beam 20 from cube beam splitter 18 illuminates acousto-optic Bragg cell 22, and beam 36 from cube beam splitter 18 illuminates acousto-optic Bragg cell 38. The angle of incidence of beams 20 and 36 at Bragg cells 22 and 38 is the Bragg angle for the cells center frequency $\omega_o$.

Figure 2:
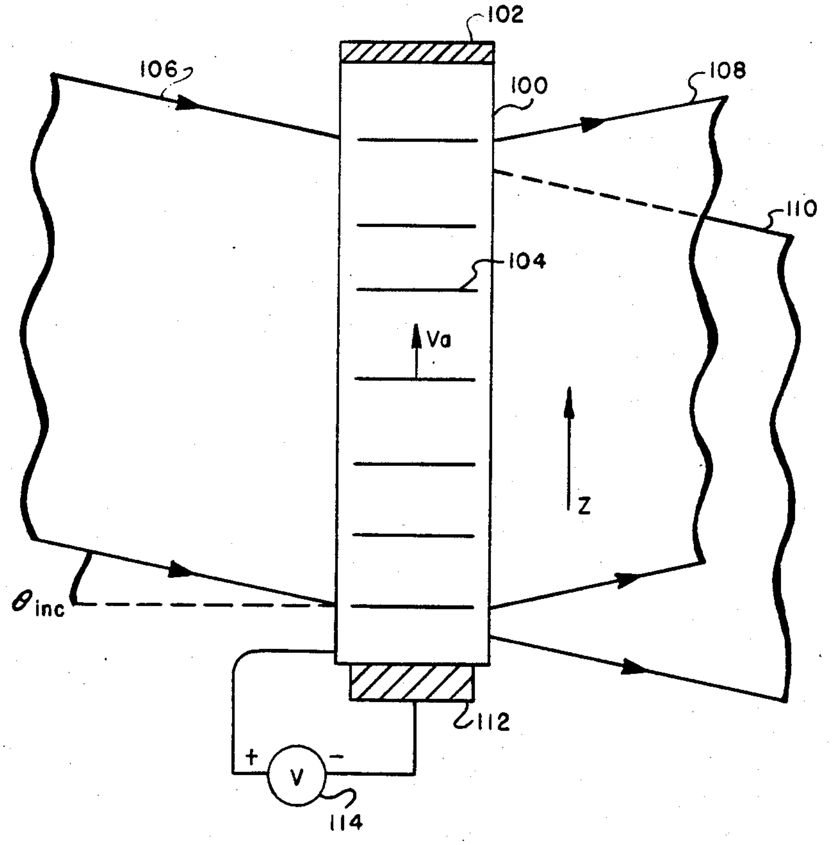
FIG. 2 illustrates in greater detail one of the Bragg cells shown in FIG. 1.

The basic elements of the multipurpose acousto-optic signal processor shown in FIG. 1 are the acousto-optic Bragg cells 22 and 38. This element is shown in greater detail in FIG. 2. This device comprises an ultrasonic medium 100, an acoustic transducer 112 attached to one end of medium 100, and an acoustic absorber 102 attached to the opposite end of medium 100. An electrical signal V, represented by voltage generator 114, is applied to acoustic transducer 112 and is converted to sound by means of the piezoelectric effect. In this example, $V=(t)\cos\omega_a(t+\phi)$. The sound generated propagates through transparent medium 100, where the stress due to the sound modulates the refractive index of the medium. This modulated refractive index n forms a phase grating which can diffract light that is incident on the sound stressed medium. In FIG. 2, the sound phase fronts are shown by 104. Incident light 106 is directed across medium 100 at an angle of incidence equal to $\theta_{inc}$. The light is refracted, and a diffracted beam of light 108 and an undiffracted beam of light 100 exit the medium.

When the angle of incidence of the light illuminating the sound wave is set to the Bragg $\theta_B$, where $$\theta_B = \sin^{-1}\frac{\lambda_l}{2\lambda_a}, \tag{1}$$

and $\lambda_l$ is the incident light wavelength and $\lambda_a$ is the sound wavelength, constructive interference occurs for only a single first order diffraction (the case shown in FIG. 2). To insure operation in the Bragg diffraction regime, the width W of the acoustic phase fronts must be great enough that the quantity Q, defined as $$Q = \frac{2\pi}{n}\;\frac{\lambda_l W}{\lambda_a^2}, \tag{2}$$

is greater than 10.

The frequency of the diffracted light is shifted by the sound frequency, upshifted if the light is diffracted in the direction of sound propagation and downshifted if away. The intensity of the diffracted light $I_D$ can be shown to be $$I_D = I_O\,\eta\,\mathrm{sinc}^2(\eta+[\Delta k W/2]^2)^{\frac{1}{2}} \tag{3}$$

where $I_O$ is the incident light intensity, $\eta$ is defined as $$\eta = \frac{\pi^2}{2\lambda_l^2}(M_2)\frac{W}{\lambda_a}P_a \tag{4}$$

and $\Delta k$ is the momentum mismatch between the incident light and the acoustic propagation vectors. $P_a$ is the acoustic power and $M_2$ is an acousto-optic figure of merit of the delay line material.

Operation in the Bragg regime maximizes the efficiency of the interaction, and simplifies subsequent optical manipulation of the diffracted light. For plane light and acoustic waves, the momentum mismatch is zero at Bragg incidence, and the intensity of the diffracted light $I_D$ is described by $$I_D = I_0 \sin^2\left(\frac{\pi}{\lambda_l}\left[M_2\frac{W}{2\lambda_a}P_a\right]^{\frac{1}{2}}\right) \tag{5}$$

For sufficiently small acoustic power $P_a$, the diffracted light intensity may be considered linear with acoustic power. While true plane wave conditions cannot be achieved, by using only the near field acoustic region of the Bragg cell and using well collimated light, ΔK may be kept acceptably small and equation 5 is a good description of the interaction.

In FIG. 2, a bandpass signal A(t) cos $\omega_a(t+\phi)$ is shown generating a sound wave S(t,z) which propagates through the Bragg cell. This sound wave may be described as $$S(t,z)=A'(t-z/v_a)\cos\omega_a(t-z/v_a+\phi) \quad (6)$$

where $v_a$ is the acoustic propagation velocity and z is the distance along the Bragg cell. The light $L_D(t,z)$ that this Bragg cell diffracts may be represented by $$L_D(t,z) = \quad (7)$$

$$L_O A''\left(t-\frac{z}{v_a}\right)\cos\left(\omega_l t+\omega_a\left[t-\frac{z}{v_a}+\phi\right]+\frac{z\sin\theta_B}{\lambda_l}\right)$$

where $\omega_l$ is the incident light frequency and $L_O$ is the incident light amplitude. The diffracted light $L_D(t,z)$ is seen to contain all the signal information between the time t and $t-Z/v_a$, where Z is the illuminated length of the Bragg cell; and to exit the cell at an angle $\theta_B=\sin^{-1}\lambda_l/2\lambda_a$, which may be considered to be proportional to the frequency of the signal for the light and signal frequencies commonly used in the these devices.

Figure 3:
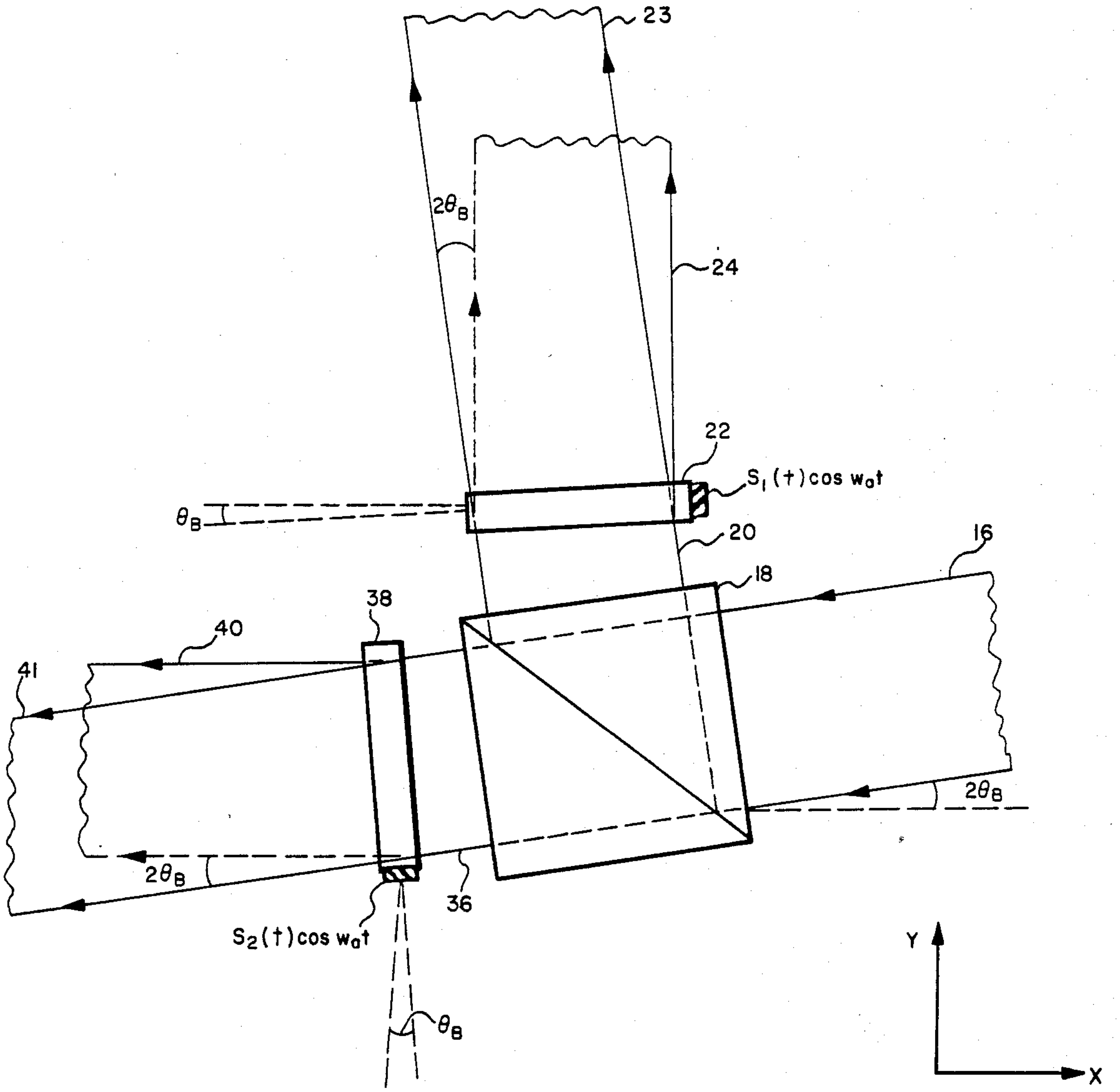
FIG. 3 illustrates the action of the beam splitter 18 and acousto-optic cells 22 and 38 shown in FIG. 1.

Referring again to FIG. 1, and to FIG. 3, signals $S_1(t)\cos\omega_a t$ and $S_2(t)\cos\omega_a t$ are applied to acousto-optic Bragg cells 22 and 38, respectively. Expanded laser beam 16 enters cube beam splitter 18 at an angle of $2\theta_B$, where $\theta_B$ is the Bragg angle for acousto-optic Bragg cells 22 and 38. Cube beam splitter 18 splits beam 16 into beam 20 and beam 36. Beam 20 illuminates acousto-optic Bragg cell 22 at an angle equal to $2\theta_B$, and beam 26 illuminates acousto-optic Bragg cell 38 at an angle also equal to $2\theta_B$. Acousto-optic Bragg cell 22 diffracts beam 20, producing a diffracted beam 24 and an undiffracted beam 23, and acousto-optic Bragg cell 38 diffracts beam 36, producing a diffracted beam 40 and an undiffracted beam 41. In each instance, the angle between the diffracted and undiffracted beam is $2\theta_B$. The diffracted light $L_1(t,x)$ from acousto-optic Bragg cell 22 is described by $$L_1(t,x) \simeq \quad (8)$$

$$S_1\left(t-\frac{x}{v_a}\right)\cos\left(\omega_l t+\omega_a\left[t-\frac{x}{v_a}\right]+\frac{x\sin\theta_D}{\lambda_l}\right)$$

and the diffracted light $L_2(t,y)$ from acousto-optic Bragg cell 38 is described by $$L_2(t,y) \simeq \quad (9)$$

-continued $$S_2\left(t-\frac{y}{v_a}\right)\cos\left(\omega_l t+\omega_a\left[t-\frac{y}{v_a}\right]+\frac{y\sin\theta_D}{\lambda_l}\right)$$

In these equations $$\theta_D=\sin^{-1}\frac{\lambda_a-\lambda_O}{\lambda_l}, \quad (10)$$

where $\lambda_o$ is the acoustic wavelength at the Bragg cell design center frequency $\omega_o$.

Figure 4:
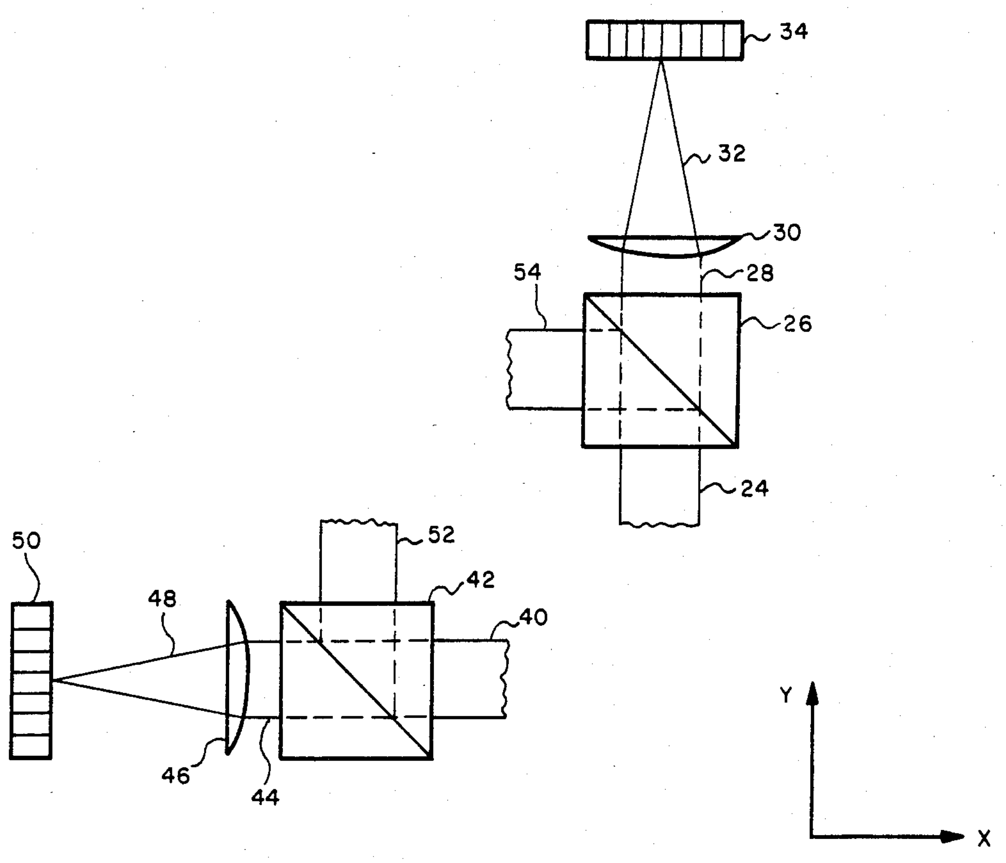
FIG. 4 illustrates the action of beam splitters 26 and 42 and lenses 30 and 46 distributing light beams 28 and 44 to square-law photodiode detector arrays 34 and 50 shown in FIG. 1.

As shown in FIGS. 1 and 4, diffracted beam 24 is split into beams 28 and 54 by cube beam splitter 26, and diffracted beam 40 is split into beams 44 and 52 by cube beam splitter 42. Beams 28 and 44 pass through well corrected lens systems of effective focal 30 and 46. At the back focal plane of these lens systems the light distribution $U_1(t,x_f)$ and $U_2(t,y_f)$ of $L_1(t,x)$ and $L_2(t,y)$ are formed, and are described by (using the well known Fourier transform properties of lenses)

$$U_1(t,x_f) = \quad (11)$$

$$\exp\left[j\frac{k}{2f}x^2\right]\int_{x=0}^{X} L(t,x)\exp\left[-j\frac{2\pi}{\lambda_l f}(x_f x)\right]dx$$

and $$U_2(t,y_f) = \quad (12)$$

$$\exp\left[j\frac{k}{2f}y^2\right]\int_{y=0}^{Y} L_2(t,y)\exp\left[-j\frac{2\pi}{\lambda_l f}(y_f y)\right]dy$$

where $x_f$ and $y_f$ are the coordinates at the back focal planes, x and y the spatial coordinates at the illuminated aperture of the Bragg cells, and X and Y are the lengths of the Bragg cells. $U_1$ and $U_2$ are seen to be proportional to the Fourier transforms of $L_1(\tau)$ and $L_2(\tau)$, where $\tau$ is the delay variable $x/v_a$ or $y/v_a$.

Square-law photodiode detector arrays 34 and 50 are disposed at the back focal planes of Fourier lens systems 30 and 46. Arrays 34 and 50 detect the intensity of light distributions 32 and 48, respectively, and integrate the detected signal for some time period. The output of arrays 34 and 50 is therefore proportional to the power spectral density of the signals $S_1(\tau)$ and $S_2(\tau)$, resolved to a limit determined by the time aperture of the Bragg cell ($X/V_a$ and $Y/V_a$) and time averaged over the integration period of the array.

Figure 5:
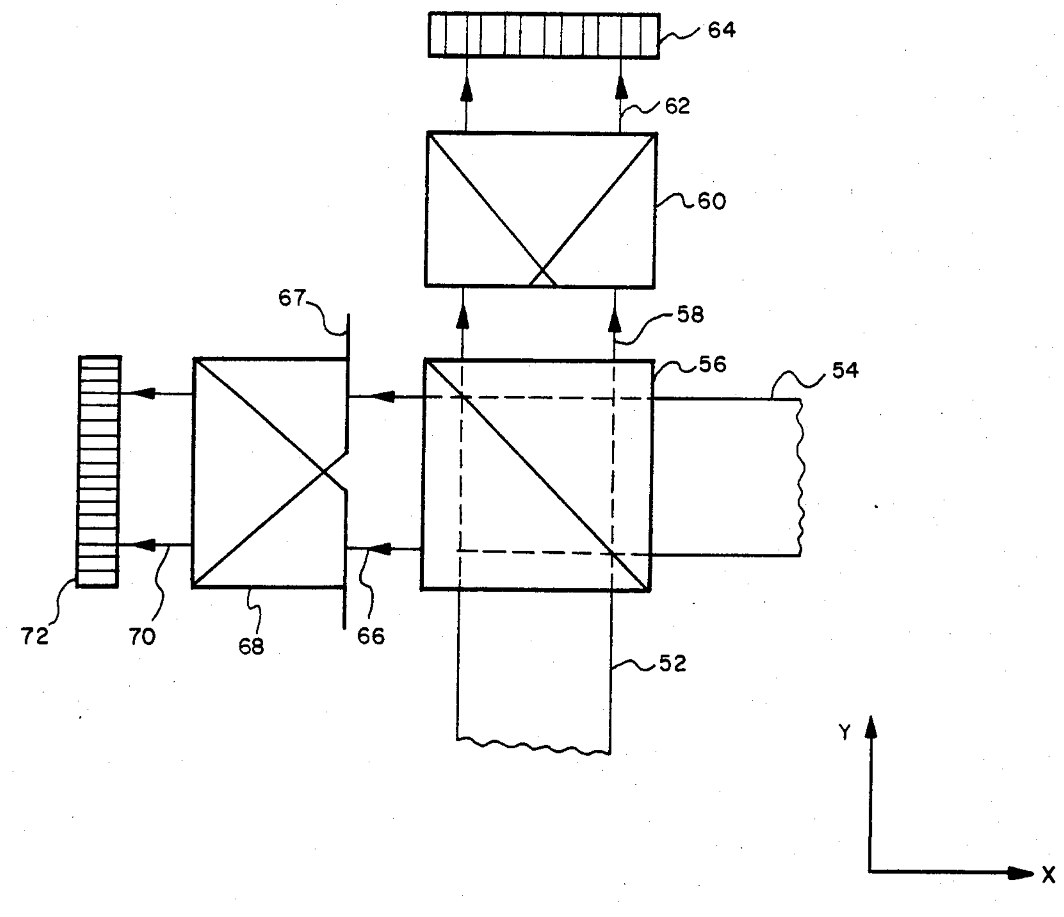
FIG. 5 illustrates the action of beam splitter 56 on beams 52 and 54 from beam splitters 26 and 42 giving combined beams 58 and 66 to be filtered by Schlerin filter systems 60 and 68 illuminating the time integrating square-law photodector arrays 64 and 72 shown in FIG. 1.

FIGS. 1 and 5 show that beam 52 from cube beam splitter 42 and beam 54 from cube beam splitter 26 are combined in cube beam splitter 56. Combined beams 58 and 66 exit from cube beam splitter 56, and are Schlerin filtered by Schlerin filter systems 60 and 68 to remove undiffracted light. Beams 62 and 70 illuminate time integrating square-law photodetector arrays 64 and 72. The output of the arrays may be described as $$V_{out}(z) \sim \int_T (L_1'(t,x)+L_2'(t,y))^2 dt \quad (13)$$

or expanding the square $$V(z) \sim \int_T [L_1'(t,x)]^2\,dt + \int_T [L_2'(t,y)]^2\,dt + 2\int_T L_1'(t,x)L_2'(t,y)\,dt \quad (14)$$

where z is the physical location along the detector array, and is proportional to the distances x and y along the Bragg cells, and the prime denotes a possible spatial phase change due to reflection. The cross term contains the signal of interest, and is $$V'(z) \sim 2\int S_1\left(t - \frac{x}{v_a}\right) S_2\left(t - \frac{y}{v_a}\right) \cos\left(\omega_l t + \omega_a\left[t - \frac{x}{v_a}\right] \pm \frac{x\sin\theta_D}{\lambda_l}\right) \cdot \cos\left(\omega_l t + \omega_a\left[t - \frac{y}{v_a}\right] \mp \frac{y\sin\theta_B}{\lambda_l}\right) dt \quad (15)$$

where the sign of the spatial phase term depends on the light path.

The spatial variables z, x, and y are related by: (1) the magnification ratio M of the particular Schlerin system through which the two diffracted beams pass, and (2) by the particular light path followed by each diffracted beam with respect to the number of reflections each undergoes.

If the magnification at array 64 is 1:1, then x=z and y=Y−z, where Y is the illuminated length of Bragg cell 38. The cosine product of this cross term may be manipulated using the cosine product identity (cos a)(cos b)=½[cos (a+b)+cos (a−b)]. The difference term at array 64 is then $$V_3'(z) \sim \cos\left(2[\omega_a - \omega_0]\frac{z}{v_a}\right) \int_T S_1\left(t - \frac{z}{v_a}\right) S_2\left(t - \frac{y - z}{v_a}\right) dt \quad (16)$$

Identifying $z/v_z$ as $\tau$ and $Y/v_a$ as $\tau_O$, and making a change of variable $t' = t - \tau$ yields $$V_3'(z) \sim \cos(2[\omega_a - \omega_0]\tau) \int_T S_1(t')\,S_2(t' + 2\tau - \tau_0)\,dt \quad (17)$$

which is the correlation of the bandpass signals $S_1(t)\cos\omega_a t$ and $S_2(t)\cos\omega_a t$ offset by the frequency $\omega_O$, and in a compressed, shifted time frame.

Array 72 is illuminated by an apertured and magnified portion of the diffracted light, and has output $V_4(z)$ described by $$V_4(z) \sim \cos\left(\frac{2}{M}[\omega_a - \omega_0]\tau\right) \int_T S_1(t')\,S_2\left(t' + \frac{2\tau}{M} - \tau_0'\right) dt \quad (18)$$

so a more restricted delay range falls on this array.

This correlator is a coherent optical system, since all light is derived from a single laser source, and the output is a detected interference pattern of the diffracted light from the two Bragg cells.

The type of Bragg cell used in the processor has a marked effect on the size and performance of the processor. The length and diode spacing of the photodiode arrays which detect the spatial light distributions also affects the size and performance of the processor. If a 50 μs Bragg cell delay length is used to insure 25 KHz frequency resolution, the physical length (and illuminated aperture) of a $LiNbO_3$ surface acoustic wave (SAW) cell would have to be 17.5 cm (nearly 7 inches), while a $Bi_{12}GeO_{20}$ SAW Bragg cell would be 3.1 cm. Obviously the $TeO_2$ Bragg cell results in the smallest processor as far as the laser beam expander, collimator, Bragg cell, and beam splitter portion are concerned. In addition, the greater angular beam diffraction versus frequency of this cell results in much shorter focal length (and so more compact) Fourier transform lens system to achieve the spot travel required by a given diode array length.

This compactness is achieved with one decided disadvantage: The spatial frequency variation versus signal frequency change at the correlator detector arrays is greatly increased. From equation 15, the array signal variation with z, distance along the array, is seen to include a term $$V(z) \sim \cos\left(2[\omega_a - \omega_0]\frac{z}{v_a}\right). \quad (19)$$

For the 617 m/s sound velocity in $TeO_2$ this yields a spatial frequency of about $3.3\times10^4$ cycles/m for $|\omega_a - \omega_O| = 2\times10.3$ MHz, so a maximum bandwidth of 20.6 MHz can be sampled by a commercially available detector array with 15 μm diode spacing. For the same array diode spacing, a correlator using $LiNbO_3$ SAW Bragg cells would have a usable bandwidth of 114 MHz.

The usable correlation bandwidth with $TeO_2$ Bragg cells can be increased by magnifying the diffracted beams with the Schlerin filter system. Using a 2:1 magnification ratio and a commercially available 4096 diode array 62 mm long would allow 30 MHz signal bandwidth with about 2.7 samples per spatial cycle, and would display the full time aperture of the cells. This bandwidth is achieved in commercially available $TeO_2$ Bragg cells with 50 μs delay apertures, providing a performance matched system.

The second array used for correlation detection is illuminated by only the center section of the diffracted light beams. An aperture stop 67 in FIGS. 1 and 5 blocks light from all but the center 4 μs of the Bragg cells, and the spatial extent of this light is magnified in the second Schlerin system by 10. The expanded output illuminates a 25.6 mm long 1024 diode high dynamic range detector array which provides high resolution time difference of arrival information. The minimum correlation width expected with 30 MHz bandwidth signals is approximately 67 ns. In the compressed $\tau$ space of the correlator, this corresponds to a spatial extent of about 0.02 mm, which would be expanded to 0.2 mm by the magnification by 10. This would be sampled by 8 diodes, allowing time difference of arrival extrapolation to about 8 ns.

The size and diode spacing of the commercially available ultra fast readout detector diode arrays affects the design of the Bragg cell spectrum analyzer. Very fast array readout is needed for time of reception determination of signal frequency changes, limiting array choice to one 25.6 mm long with 1024 diodes. The entire array can be read out in 10 μs using a combination serial-parallel scheme. Twenty-five kHz resolution of 30 MHz bandwidth requires 1200 resolvable spots, more spots than diodes on this array. This problem is resolved by using 1.66 meter effective focal length lens systems for transformation, resulting in 51 mm spot travel at the back focal plane for 30 MHz bandwidth. Array 34 in FIG. 1 is positioned to detect the 600 resolvable spots from the lower 15 MHz of signal bandwidth, and array 50 detects the upper 15 MHz. This, of course, requires that the same signals are supplied to both Bragg cells. This is the case, in terms of signal power spectrum, for many applications.

Figure 6:
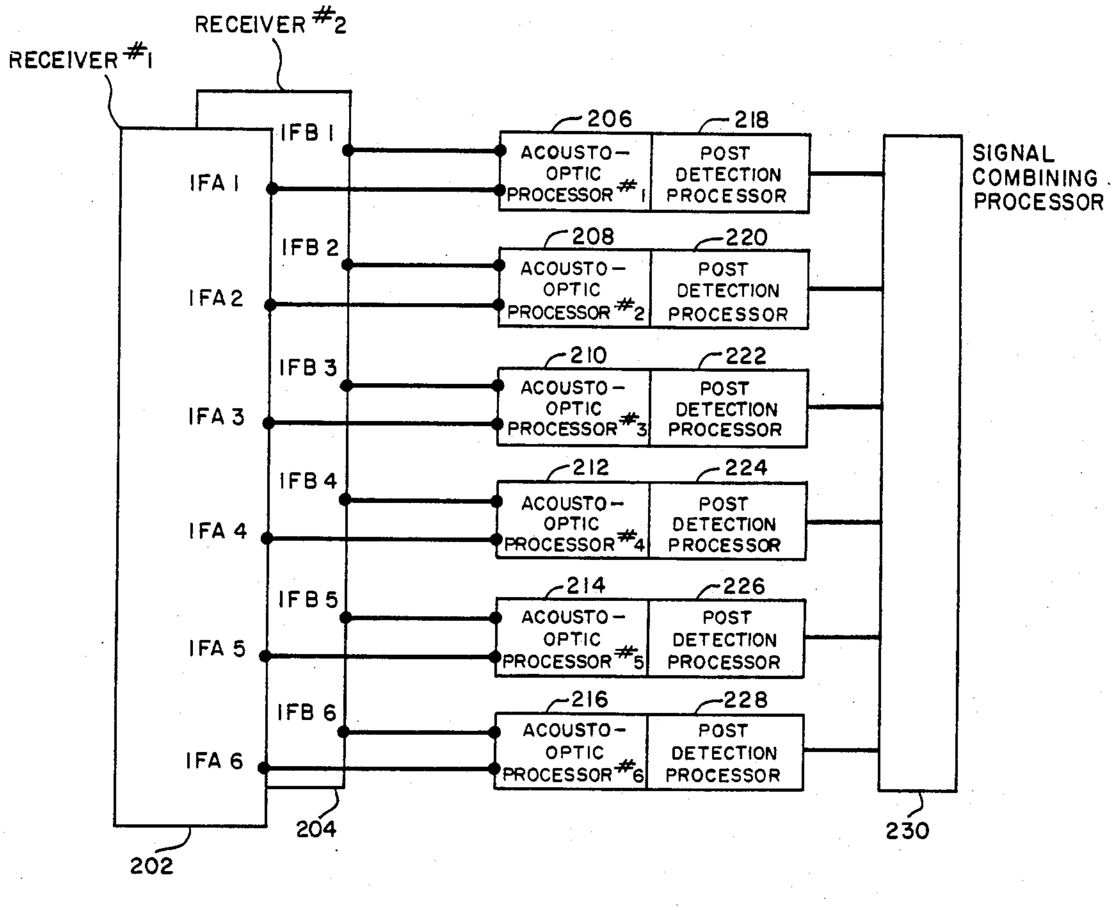
FIG. 6 illustrates a parallel combining scheme for increasing the instantaneous bandwidth of a receiver system.

The acousto-optic signal processor that has been described is limited to about 30 MHz instantaneous bandwidth by practical material considerations. FIG. 6 illustrates a parallel combining scheme for increasing the instantaneous bandwidth of a receiver system employing these processors, without sacrifice of resolution or other processor performance.

In FIG. 6, six identical acousto-optic processors, 206, 208, 210, 212, 214, and 216 are shown. Each processor takes its input signals from the corresponding intermediate frequency outputs, IFA1 to IFA6 and IFB1 to IFB6, of 180 MHz total instantaneous bandwith (input bandwidth) channelized receivers 202 and 204. Each acousto-optic processor is digitally post detection processed s a stand alone system by post detection processors 218, 220, 222, 224, 226, and 228. The outputs from the six post detection processors are then further analyzed by a system which digitally restores the frequency offset information to each individual output, and examines the combined signal. This is represented by signal combining processor 230. The result is a 180 MHz bandwidth spectrum analyzer with 25 KHz frequency resolution and 10 μs time of reception resolution, combined with a 180 MHz bandwidth time integrating correlator able to detect signals 40 dB below the wide band noise level, and resolve time difference of arrival to about 1 ns (for maximum bandwidth signals).

While the invention has been described to make reference to the accompanying drawings, I do not wish to be limited to the details shown therein as obvious modification may be made by one of ordinary skill in the art.

We claim:

1. A device, comprising:

a. means for producing a laser beam;

b. means to expand said laser beam;

c. first beam splitter means for splitting said expanded laser beam into first and second beams;

d. first means for diffracting said first beam;

e. second means for diffracting said second beam;

f. second beam splitter means for splitting said diffracted first beam into third and fourth beams;

g. third beam splitter means for splitting said diffracted second beam into fifth and sixth beams;

h. a first Fourier transform lens system disposed in the path of said third beam;

i. a second Fourier transform lens system disposed in the path of said sixth beam;

j. first detector means disposed at the back focal plane of said first Fourier transform lens system;

k. second detector means disposed at the back focal plane of said second Fourier transform lens system;

l. fourth beam splitter means for combining said fourth and fifth beams and for splitting the combined beams into seventh and eighth beams;

m. first Schlerin spatial filter means disposed in the path of said seventh beam for filtering undiffracted light from said seventh beam;

n. second Schlerin spatial filter means disposed in the path of said eighth beam for filtering undiffracted light from said eighth beam;

o. third detector means disposed in the output of said first Schlerin spatial filter; and p. fourth detector means disposed in the output of said second Schlerin spatial filter.

2. The device of claim 1 wherein said first beam splitter means comprises a first cube beam splitter.

3. The device of claim 1 wherein said second beam splitter means comprises a second cube beam splitter.

4. The device of claim 1 wherein said third beam splitter means comprises a third cube beam splitter.

5. The device of claim 1 wherein said fourth beam splitter means comprises a fourth cube beam splitter.

6. The device of claim 1 wherein said first means for diffracting said first beam comprises a first acousto-optic Bragg cell.

7. The device of claim 1 wherein said second means for diffracting said second beam comprises a second acousto-optic Bragg cell.

8. The device of claim 1 wherein said first detector means comprises a first square-law photodiode detector array.

9. The device of claim 1 wherein said second detector means comprises a second square-law photodiode detector array.

10. The device of claim 1 wherein said third detector means comprises a first time integrating square-law photodetector array.

11. The device of claim 1 wherein said fourth detector means comprises a second time integrating square law photodetector array.

12. The device of claim 4 wherein said first acousto-optic Bragg cell comprises:

a. an ultrasonic medium;

b. an acoustic transducer disposed on said medium and supplied with a first signal to be propagated across said medium; and c. an acoustic absorber.

13. The device of claim 6 wherein said second acousto-optic Bragg cell comprises:

a. an ultrasonic medium;

b. an acoustic transducer disposed on said medium and supplied with a second signal to be propagated across said medium; and c. an acoustic absorber.

* * * * *